March 31, 1964   P. R. GREEN ETAL   3,126,913
PISTON OPERATED FLUID TRANSFER APPARATUS
Filed March 15, 1960                2 Sheets-Sheet 2

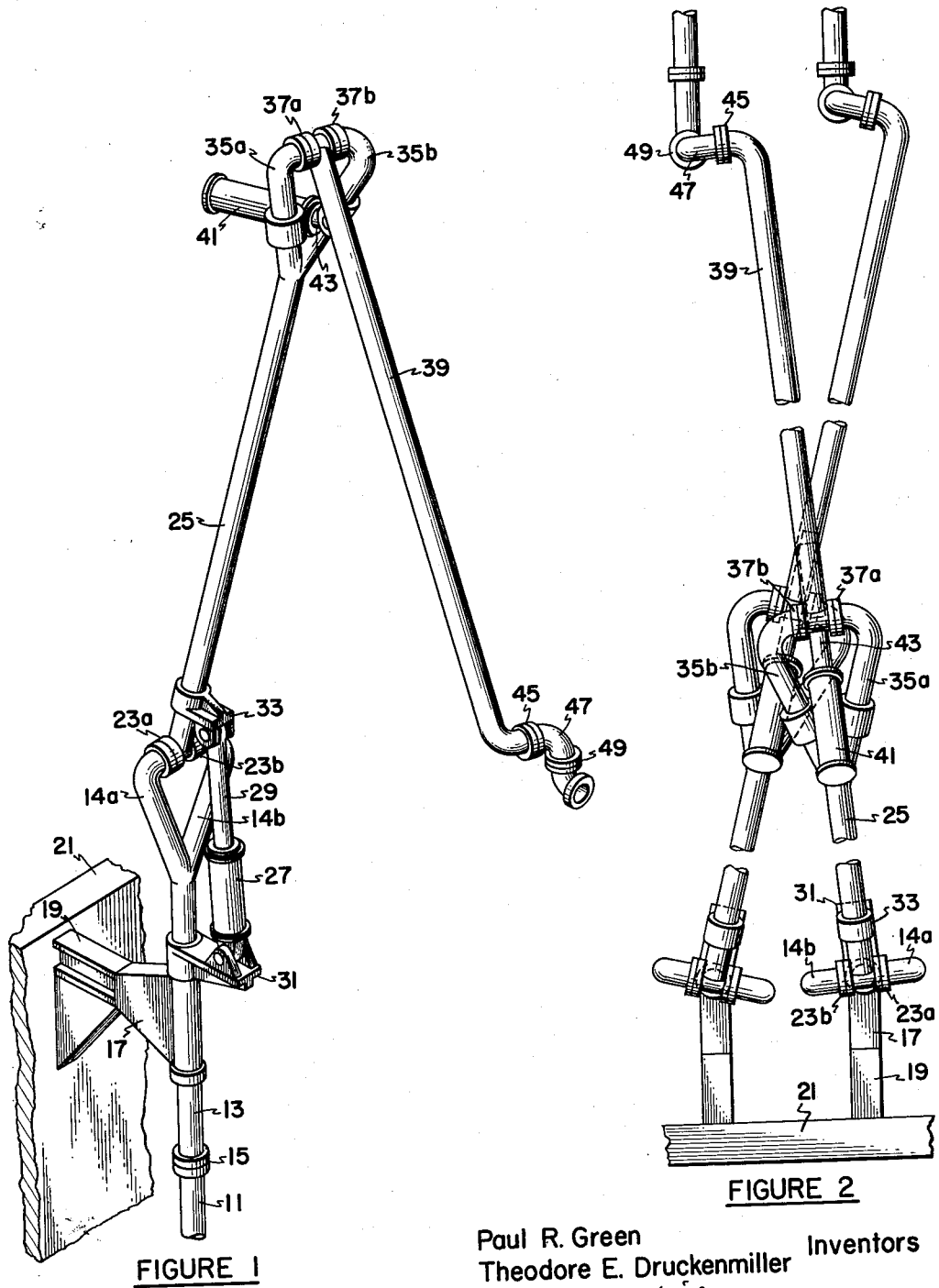

Paul R. Green
Theodore E. Druckenmiller   Inventors

By W. V. T Heilman
                Patent Attorney

United States Patent Office 3,126,913
Patented Mar. 31, 1964

3,126,913
PISTON OPERATED FLUID TRANSFER
APPARATUS
Paul R. Green, Cranford, and Theodore E. Druckenmiller, Chatham, N.J., assignors to Esso Research and Engineering Company, a corporation of Delaware
Filed Mar. 15, 1960, Ser. No. 15,104
2 Claims. (Cl. 137—615)

The present invention relates to an apparatus for loading or unloading fluids in large vessels such as tankers, barges, and the like. It is particularly adapted for the handling of crude oil and petroleum products in ocean-going tankers although it is obviously applicable to vessels of other types, such as smaller boats, railroad tank cars, and storage tankage in general.

In the prior art, marine loading equipment of the type to which this invention relates, sometimes referred to as "loading arms" or "hose handling rigs," is normally mounted on wharves or docks and supported by cranes. The heavy pipe connections which are made between ship and shore, for example, require substantial operating equipment and, in the past, sets of cables and sheaves or pulleys with suitable operating engines have commonly been employed for this purpose. Hence, the loading arms of the prior art have required supporting cranes and operating equipment in addition to the connecting pipes, hoses, and the like, entailing considerable expense and complexity in operation. The cables and sheaves frequently give trouble due to their exposure, need for continual lubrication and maintenance, and the tendency of the cables to bind and cause operating difficulties.

It is an object of the present invention to overcome the foregoing difficulties and to reduce and simplify substantially the structural and operating equipment required for transferring liquids and gases such as petroleum, liquefied petroleum gases, etc., onto and off marine vessels. This is accomplished by using the loading arm equipment itself through which the petroleum or other liquid or gas is to flow as the supporting crane structures. The operating pulleys and cables of the prior art are replaced by simple fluid-operated control mechanisms preferably in the form of simple pneumatic and/or hydraulic cylinder and piston operators suitably connected to the arm or pipe sections which are secured together with hinged or pulley connections. The invention will be more clearly understood by reference to the detailed description which follows below which, in turn, is given by reference to the accompanying drawings.

In the drawings, FIGURE 1 shows a preferred form of the invention in elevation.

FIGURE 2 is a plan view showing two units of the type illustrated in FIGURE 1, one crossing over the other to illustrate the flexibility of the equipment in operations such as tanker loading and unloading.

Figure 3:
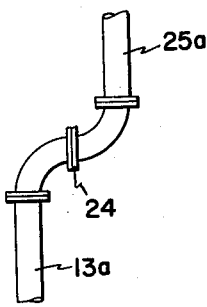
FIGURE 3 shows a modified or alternative form of hinged joint or "swing joint" which is suitable for use in the apparatus of FIGURE 1.

Referring now to FIGURE 1, there is shown a rigid pipe or riser 11 which is supported in any suitable manner in a dock, wharf, or other foundation structure for rigid mounting. On top of the pipe or riser 11 is mounted a standpipe 13 which is adapted to be swung around a pivot or rotation joint 15, that is, around the axis of the standpipe. The standpipe 13 is supported for such rotation and is maintained substantially in a vertical position by a pier unit 17 rigidly mounted through suitable connections 19 to a foundation or dock structure of rigid type 21.

At its upper end, the standpipe 13 is forked, as indicated at 14a and 14b, to provide a double hinge or joint structure 23a and 23b which receives the mounting hinge element of the connecting or cranelike pipe section 25. The latter is mounted to swing in a substantially vertical plane about the double hinges 23a and 23b. A hydraulic operating mechanism shown as cylinder 27 with a piston which operates rod 29 is connected between a rigid bracket 31 firmly secured to standpipe 13 and a bracket 33 mounted on pipe section or crane member 25. Obviously, by operating the hydraulic cylinder and piston, the crane or pipe section 25 will swing in a substantially vertical plane about the hinges 23a and 23b. Also, by rotating the standpipe 13 about its own axis, the whole structure may be swung through a horizontal arc at the pivot 15.

At its normal upper end, the crane or pipe extension 25 is forked at 35a and 35b to provide another double hinge or swing joint indicated at 37a and 37b to which is pivotally secured a second pipe section 39. The positions of the crane member 25 and the extension 39 may be varied around the hinges 37a and 37b by a second hydraulic operating mechanism comprising the cylinder 41 and the piston and rod assembly 43, the latter being shown connected to pipe 39 and the former to section 25.

At its opposite end, shown as its lower end in FIGURE 1, pipe 39 has another hinged connection 45 to a pivoting elbow unit 47 which is preferably provided for rotation in a horizontal plane around a joint or pivot element 49. The element 49 may be connected to additional pipe or hose elements to make the actual contact with the pump head on the vessel, which is not shown.

From the above description, it will be understood that by operating the hydraulic elements the crane section 25 may be raised or lowered, the pipe 39 may be swung about its pivots 37a and 37b and the elbow assembly 47, etc., can be swung, normally manually to make the desired connection to the tanker. The whole assembly may be swung manually or by motive means such as a slewing motor and the like about the pivot 15 to fit the actual point of connection on the vessel. The flexibility of the connection in both vertical and horizontal planes makes possible firm leakproof fittings which can accommodate the rise and fall of the vessel with tide or waves and the petroleum fill and reasonable amounts of lateral and longitudinal motion of the vessel with respect to the wharf or dock.

Referring now to FIGURE 2, two of the units described in FIGURE 1 are shown mounted for connection to a vessel, one being crossed over the other. This illustrates the flexibility of the type of assembly described. The elements in other respects are substantially identical with those of FIGURE 1 and need not be described in detail. The shape of the hinged or pivoted connections and the mountings of the hydraulic operating mechanisms are shown in some respects more clearly than in FIGURE 1.

While the double-hinged pivot connections of FIGURES 1 and 2 are quite satisfactory and avoid eccentric loading on the hinge or pivot structure, it may be desirable with other structures to use an alternative type of simple S-bend swing joint. For this purpose, the alternative swing joint structure of a simple S-bend pivot as shown in FIGURE 3 is advantageous. Here the riser 13a and pipe section 25a are pivotably connected at the pivot connection 24 to allow movement of the pipe section 25 in a plane substantially parallel to the riser 13a. The pipe section 25a corresponds to the crane element 25 of FIGURE 1. The same alternate structure obviously is applicable at the hinges 37a and 37b and also at hinge or joint 45 where that is desirable.

Figure 4:
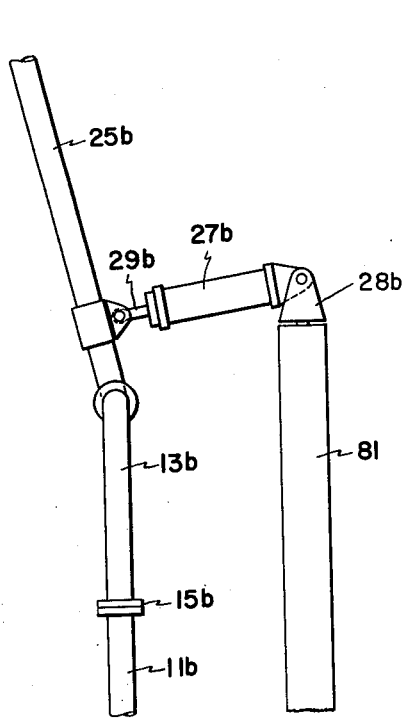
FIGURES 4 and 5 show respectively alternative arrangements for operating the main crane section of the pipe about its hinged connection with the base or standpipe unit.
Figure 5:
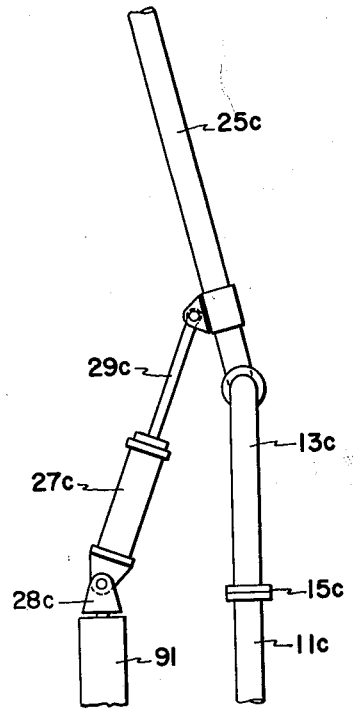

Instead of mounting the fluid operating mechanism directly on the standpipe as in FIGURE 1, it may be mounted between a rigid structure 81 and the crane element 25b as shown in FIGURE 4. Still another alternative is indicated in FIGURE 5 where the hydraulic mechanism 27c, 29c is connected between the solid pier or abutment element 91 and main swing pipe or crane element 25c which corresponds to the main pipe 25 of FIGURE 1. In both FIGURES 4 and 5, the fluid operating mechanisms as shown allow movement of the main swing pipe in a vertical plane, and also permit rotational movement about the axis of the standpipe. Vertical and rotational movements are accomplished by the use of universal joints 28b, FIGURE 4, or 28c, FIGURE 5, and the like at both ends of the fluid operating mechanism.

As previously suggested, this apparatus has its primary application in loading marine oil tankers and barges where it can be used to replace the large expensive and cumbersome equipment presently used. Equipment of the same type will also be used, however, for loading tankcars, tank trucks, and the like.

The inventive device, besides providing for the crossover of adjacent loading arms without the use of external supports, is also self-supporting during loading or when in an extended operating position. Another modification within the scope of the instant invention may be accomplished by the utilization of suitable pressure relief valves or means in the pneumatic or hydraulic cylinders employed in the inventive device. These relief valves or means would ensure that no excessive forces are imparted to the vessel flanges on manifolds during the loading operation. These relief means would operate to allow the motive means employed to abjust to the movement of the vessel by the relief of excessive internal hydraulic or pneumatic pressure in the cylinder when excessive force was being developed at the vessel manifold.

In the prior art, it has been suggested that hydraulic equipment may be used to manipulate and control loading arms. A very important feature of the present invention, however, is that it operates without a large boom or other steel structure which previously has been required for this type of equipment. These are entirely eliminated as are the sheaves and pulleys which often bind and give trouble. The invention eliminates the use of hoist equipment and its attendant maintenance problems, saves operating manpower, and speeds up the turnaround of the tanker or barge. The invention can be applied to existing rigid pipe loading arms with minor modifications making it possible to remove the supporting tower structures where they are in existence. The feature of permitting crossover of adjoining loading assemblies is also of substantial advantage.

The invention having been described, it is intended to claim the same as broadly as the prior art permits of interpretation of the following claims.

What is claimed is:

1. Apparatus for loading and unloading fluids in vessels, barges, and the like which comprises, in combination (1) a relatively non-rotatable riser firmly mounted in relatively fixed position, (2) a tubular standpipe swivelly mounted on the upper end of said riser for relative rotation about the standpipe axis, (3) a first connecting pipe section connected at one end to said standpipe for pivotal movement of said pipe section with respect to said standpipe in a plane substantially parallel to a plane containing said standpipe, (4) a rigid structure in fixed spatial relation to said standpipe, (5) a first fluid-actuated cylinder, piston and piston rod operating mechanism connected directly to said first connecting pipe section and connected to said structure for rotation with said standpipe and relative to said structure to cause and control the pivotal movement of said first pipe section, (6) a second connecting pipe section pivotally connected to the other end of said first connecting pipe section, and (7) a second fluid-actuated cylinder, piston and piston rod operating mechanism connected directly to and between said first connecting pipe section and said second connecting pipe section for causing and controlling pivotal movement of said second connecting pipe section with respect to said first connecting pipe section.

2. Apparatus according to claim 1 wherein said first fluid-actuated cylinder, piston, and piston rod operating mechanism is connected to said rigid structure at a point located substantially upon said standpipe.

References Cited in the file of this patent

UNITED STATES PATENTS

| | | |
|---|---|---|
| 2,722,534 | Briede | Dec. 20, 1955 |
| 2,742,914 | Hannay | Apr. 24, 1956 |
| 2,755,939 | Rush | July 24, 1956 |
| 2,953,161 | Mueller | Sept. 20, 1960 |
| 2,994,446 | Aumelaer et al. | Aug. 1, 1961 |

FOREIGN PATENTS

| | | |
|---|---|---|
| 504,791 | Great Britain | of 1939 |
| 215,740 | Australia | of 1958 |